United States Patent
Hwang et al.

(10) Patent No.: US 7,663,491 B2
(45) Date of Patent: Feb. 16, 2010

(54) SUBSTRATE DAMAGE DETECTION MECHANISM USING RFID TAG

(75) Inventors: Chi-Kuang Hwang, Hsin Chu (TW);
In-Hang Chung, Hsin Chu (TW);
Chih-Hu Wang, Hsin Chu (TW);
Ching-Cheng Tien, Hsin Chu (TW);
Bore-Kuen Lee, Hsin Chu (TW);
Tung-Chou Chen, Hsin Chu (TW);
Chia-Wen Wu, Hsin Chu (TW);
Chien-Jung Chiu, Hsin Chu (TW);
Ming-Ching Yen, Hsin Chu (TW);
Jwu-E Chen, Hsin Chu (TW)

(73) Assignee: Chung Hua University, Hsin Chu (TW)

( * ) Notice: Subject to any disclaimer, the term of this patent is extended or adjusted under 35 U.S.C. 154(b) by 734 days.

(21) Appl. No.: 11/512,281

(22) Filed: Aug. 30, 2006

(65) Prior Publication Data

US 2008/0061972 A1  Mar. 13, 2008

(51) Int. Cl.
*G08B 13/14* (2006.01)
*B60R 25/10* (2006.01)
*H04Q 5/22* (2006.01)
*H01Q 1/32* (2006.01)
*G01M 17/00* (2006.01)

(52) U.S. Cl. ............ 340/572.7; 340/572.8; 340/10.41; 340/426.27; 340/571; 340/568.2; 343/711; 343/712; 343/713; 701/29

(58) Field of Classification Search ............ 340/10.41, 340/426.27, 572.8, 572.7, 571, 572.9, 568.2, 340/545.1; 343/711, 712, 713; 701/29, 54
See application file for complete search history.

(56) References Cited

U.S. PATENT DOCUMENTS

| 6,147,605 | A | * | 11/2000 | Vega et al. | 340/572.7 |
| 6,275,157 | B1 | * | 8/2001 | Mays et al. | 340/572.5 |
| 7,132,625 | B2 | * | 11/2006 | Voeltzel | 219/203 |
| 2004/0066296 | A1 | * | 4/2004 | Atherton | 340/572.1 |
| 2004/0119593 | A1 | * | 6/2004 | Kuhns | 340/572.7 |
| 2007/0024423 | A1 | * | 2/2007 | Nikitin et al. | 340/10.1 |

* cited by examiner

*Primary Examiner*—Daniel Wu
*Assistant Examiner*—Mark Rushing
(74) *Attorney, Agent, or Firm*—Rosenberg, Klein & Lee

(57) ABSTRACT

Disclosed is a substrate damage detection mechanism using Radio Frequency Identification (RFID) tag including a substrate, at least one RFID tag with a RFID chip, a RFID transmitter and at least one data input/output port and at least one conducting circuit loop arranged to cover the substrate and provided with a first end that is electrically connected to a reference voltage and a second end that is electrically connected to the data input/output port of the RFID tag. The RFID chip generates a conductive code when the conducting circuit loop is originally conducting and generates a open-circuit code when the conducting circuit loop becomes open circuit resulting from the damage of the substrate in which both the conductive code and the open-circuit code are transmitted by the RFID transmitter and received by a RFID reader to determine the damage of the substrate.

9 Claims, 6 Drawing Sheets

SUBSTRATE DAMAGE DETECTION MECHANISM USING RFID TAG

FIELD OF THE INVENTION

The present invention relates to a substrate damage detection mechanism, and in particular to a substrate damage detection mechanism using Radio Frequency Identification (RFID) tag.

BACKGROUND OF THE INVENTION

The use of passive RFID transponders, or tags, to communicate messages of product tracking substitutes that of the barcode tags, and such use of passive RFID tags include the mounting of the RFID tags in the packaging of wine bottles and corks in which the RFID tags carry anti-counterfeit and product-tracking information. Once the cork of a wine bottle is removed, the RFID tag mounted thereof is destroyed simultaneously; hence a RFID reader ceases receiving signals from the destroyed RFID tag and the counterfeit of the wine is to be recognized and prevented. Several drawbacks exist, however. Such drawbacks include the termination of the communication of product-tracking information resulting from the destroying of the RFID tag.

Patent with International Publication Number WO2006/049374 A1 discloses a ubiquitous sensor network system, including a RFID sensor for extracting a unique number of at least one RFID chip chosen according to a used state of a monitored object among at least one RFID chip set up on a monitored object according to the number of usable states of the monitored object and a controlling unit for receiving the unique number from the RFID sensor and recognizing the used state of the monitored object on the basis of meaning information of the unique number. Major drawbacks of the above system include the number of the RFID tags needed is of equivalence with the number of usable states of the monitored object, which increases the cost, and unable to realize whether the RFID tags that are unconnected to the antenna work normally or not.

At present, security systems mainly adopt wired configuration, and more particular mainly adopts vibration or acoustic waves to detect the status of desired objects under surveillance.

SUMMARY OF THE INVENTION

The primary object of the present invention, therefore, is to provide a damage detection mechanism using RFID tags in which the tags are arranged to cover an objective substrate that could be a piece of glass, windshield of a car or heat insulating paper. As the substrate is damaged, the tags are able to communicate with a RFID reader to convey this piece of information.

Another object of the present invention is to provide a wireless identification combined with a damage detection mechanism using RFID tags in which the tags not only communicate with a RFID reader about incidents of destruction but also substitute the use of barcode tags.

In order to realize the above objects, the present invention installs a substrate damage detection mechanism using RFID tags, including a substrate, at least one RFID tag with a RFID chip, a RFID transmitter and at least one data input/output port, and at least one conducting circuit loop arranged to cover the substrate and provided with a first end that is electrically connected to a reference voltage and a second end that is electrically connected to the data input/output port of the RFID tag.

The RFID chip generates a conductive code when the conducting circuit loop is originally conducting and generates an open-circuit code when the conducting circuit loop becomes open circuit resulting from the damage of the substrate in which both the conductive code and the open-circuit code are transmitted by the RFID transmitter and received by a RFID reader to determine the damage of the substrate.

In the preferred embodiments of the present invention, the substrate may be a piece of glass, a heat insulation paper or a windshield of a car, and the conducting circuit loop could be either arranged to cover the surface of the substrate or inside the substrate.

In comparison with conventional technologies, the present invention connects a plurality of conducting materials with the data input/output port of the RFID tag, hence enables the RFID tag to communicate with a plurality of conducting materials simultaneously and responses the state (closed of opened) of the monitored object at the same time. Moreover, the present invention needs not to switch the RFID transmitter because of the digital input of the data input/output port.

The present invention overcomes the drawbacks existed in conventional technologies which are the number of the RFID tags needed equals to the number of usable states of the monitored object and unable to realize whether the RFID tags that are unconnected to the antenna work normally or not.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
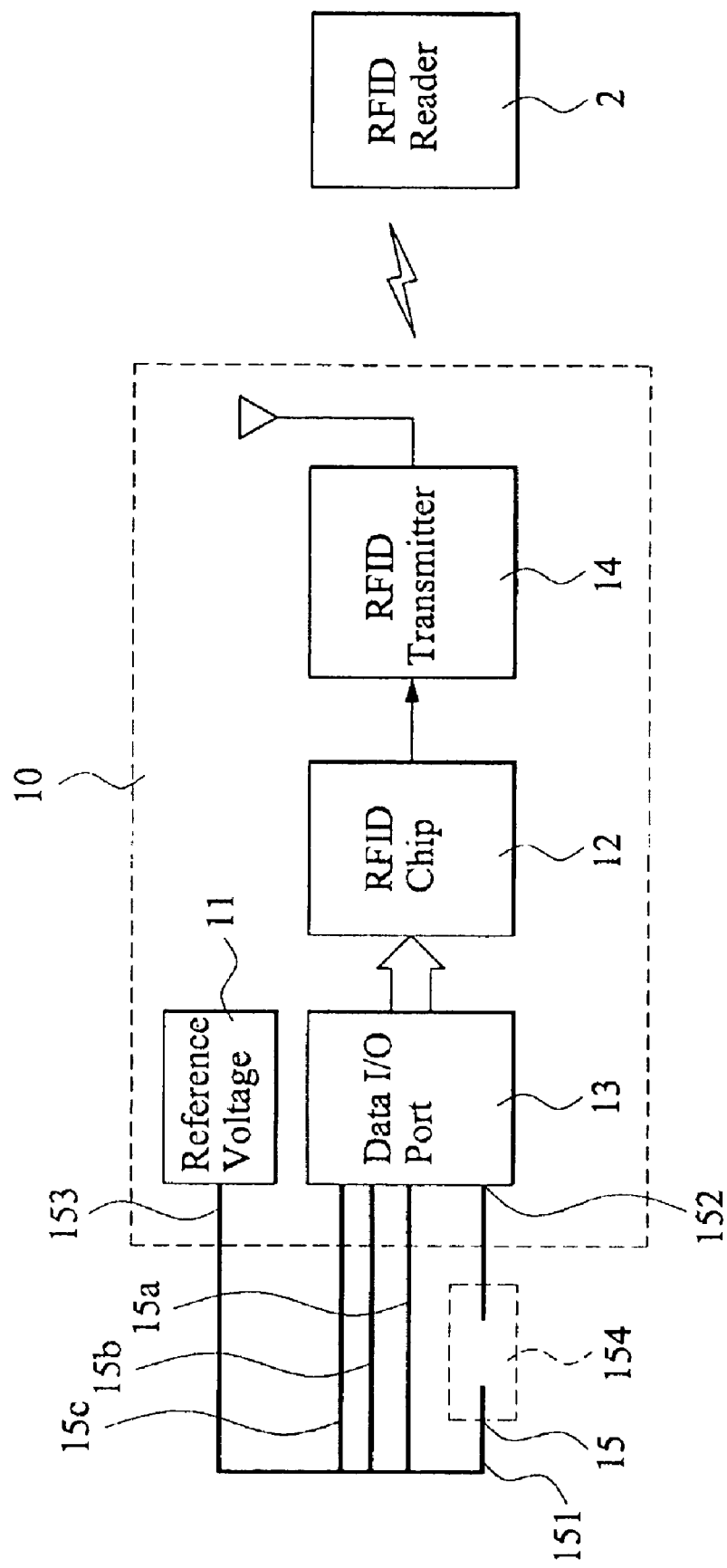
FIG. 1 is a block diagram of a substrate damage detection mechanism using RFID tags in accordance with a first embodiment of the present invention.

With reference to the drawings and in particular to FIG. 1, which is a block diagram of a substrate damage detection mechanism using RFID tags in accordance with a first embodiment of the present invention, a RFID tag 10 includes a reference voltage 11, a RFID chip 12, a data input/output port 13 connected to the RFID chip 12, a RFID transmitter 14 connected to the RFID chip 12, and a conducting circuit loop 15. The conducting circuit loop 13 is arranged in a normal-closed circuit loop manner and provided with a first end 151 that is electrically connected to the reference voltage 11 and a second end 152 that is electrically connected to the data input/output port 13 of the RFID tag 10. In practice, the RFID tag 10 may also include a plurality of conducting circuit loops 15a, 15b and 15c with the conducting circuit loops connecting the data input/output port 13 with the second end 152 and the reference voltage 11 with a common connecting end 153.

In practice, the data input/output port 13 may adopt either a pull high or a pull low design. If the data input/output port 13 adopts the pull high design, the reference voltage 11 should be a ground with a low potential. Once a fracture 154 is occurred at the conducting circuit loop 15, the potential of the data input/output port 13 changes from low to high resulting from the changing from a closed state to an opened state of the conducting circuit loop 15. On the contrary, if the data input/output port 13 adopts the pull low design, the reference voltage 11 should be a direct current power source with a high potential. Once the fracture 154 occurs at the conducting circuit loop 15, the potential of the data input/output port 13 changes form high to low resulting from the changing from a closed state to an opened state of the conducting circuit loop 15.

The RFID chip 12 generates a conductive code when the conducting circuit loop 15 is in the closed state and originally conducting and generates an open-circuit code when the conducting circuit loop 15 becomes an opened state resulting from the fracture 154 of the conducting circuit loop 15 in which both the conductive code and the open-circuit code are transmitted by the RFID transmitter 14 and received by a RFID reader 2 to determine the damage of the conducting circuit loop 15.

Figure 2:
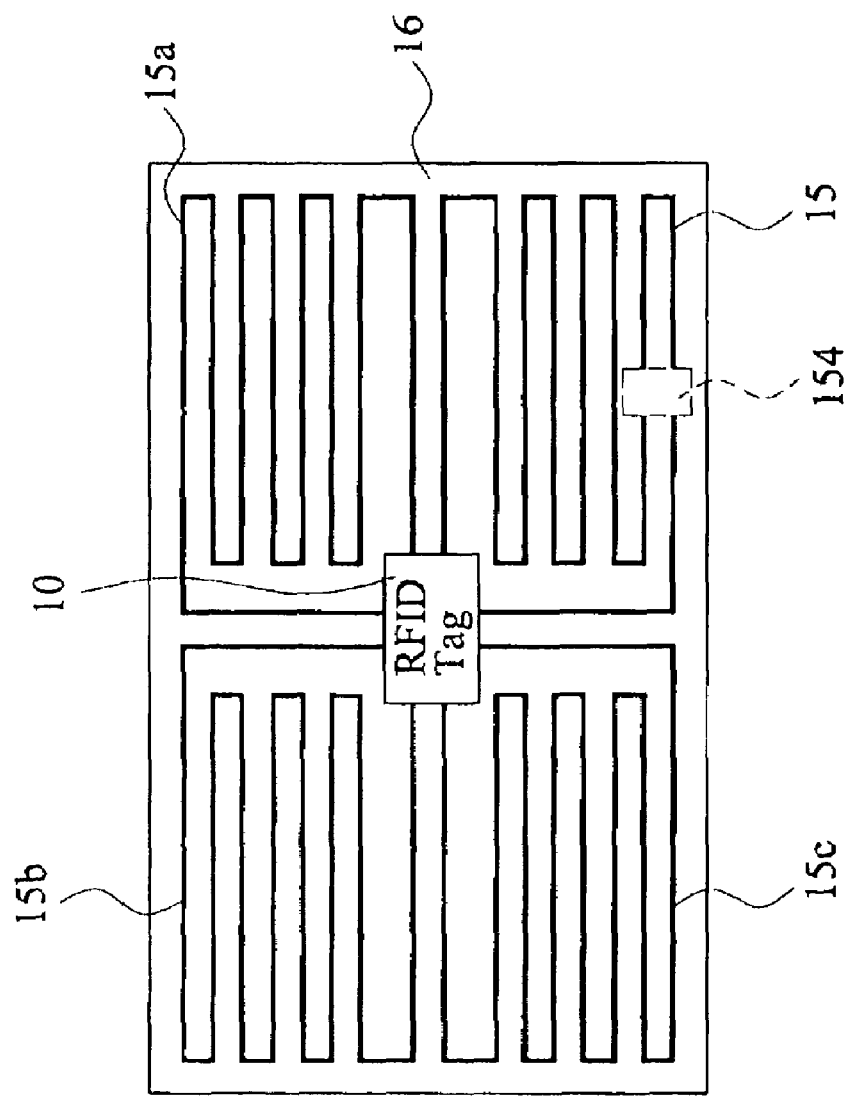
FIG. 2 shows that a number of conducting circuit loops are arranged on an objective substrate in accordance with the first embodiment of the present invention.

Please refer to FIG. 2 that shows a number of conducting circuit loops arranged on an objective substrate in accordance with the first embodiment of the present invention. As shown in the figure, the conducting circuit loops 15, 15a, 15b and 15c of the RFID tag 10 are arranged to cover an objective substrate 16. The RFID reader 2 will detect the damage of the substrate 16 if the fracture 154 occurs to both the conducting circuit loop 15 and the objective substrate 16.

Figure 3:
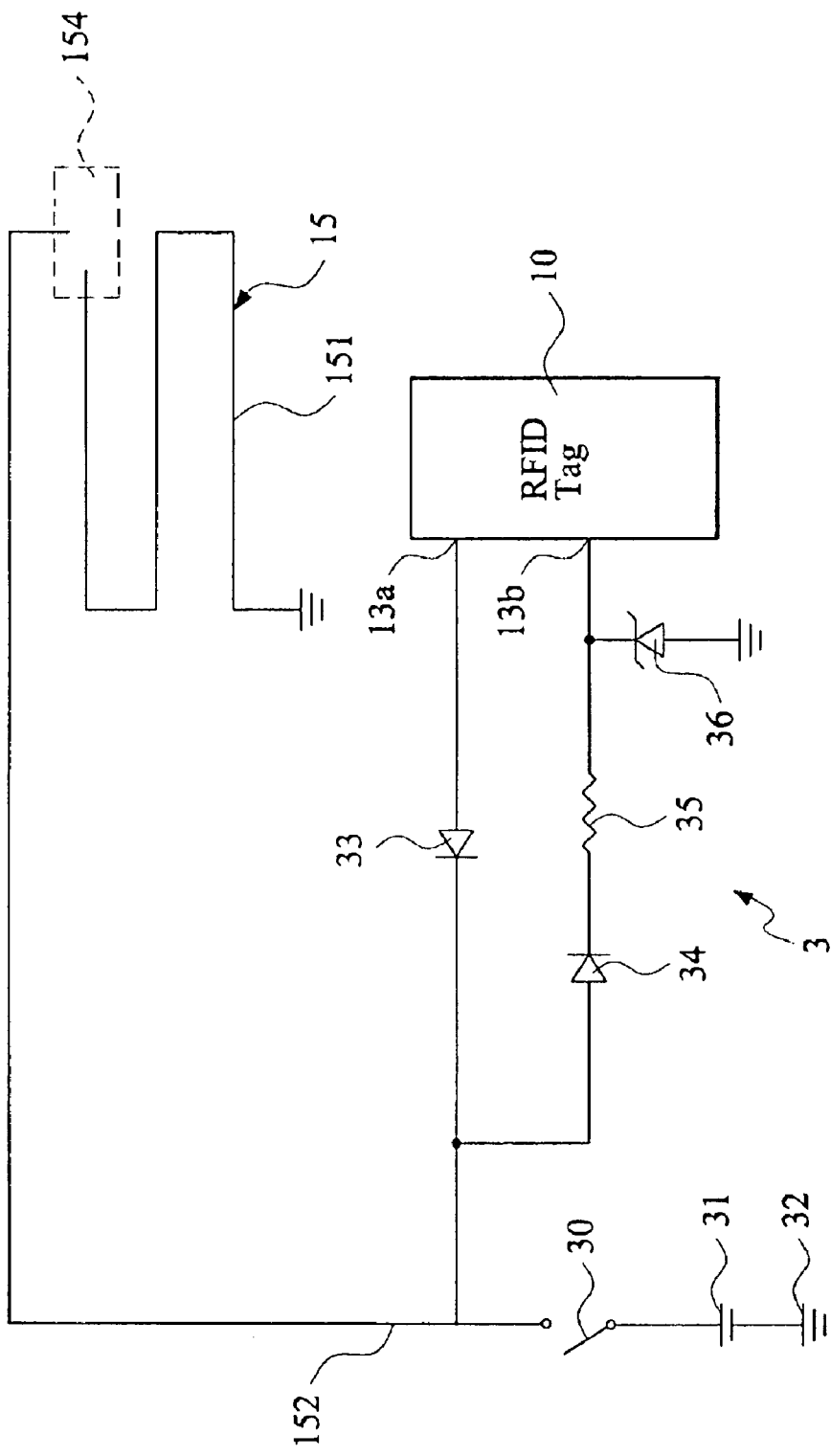
FIG. 3 shows the composing elements of a protecting circuit when the conducting circuit loop is a defogging circuit in accordance with a second embodiment of the present invention.

Please refer to FIG. 3 that shows the composing elements of a protecting circuit when the conducting circuit loop is a defogging circuit loop of a vehicle in accordance with a second embodiment of the present invention. As shown in the figure, the conducting circuit loop 15 is a defogging circuit loop of a vehicle. The first end 151 of the conducting circuit loop 15 is connected to a ground and the second end 152 is connected to a protecting circuit 3. The protecting circuit 3 is arranged between the second end 152 of the conducting circuit loop 15 and the data input/output port 13, and includes a switch 30, a power source 31, a ground 32, a first diode 33, a second diode 34, a resistor 35, and a zener diode 36. When the switch 30 is closed, an electrical power energy is supplied to the protecting circuit 3

The RFID tag 10 is provided with a first data input/output pin 13a and a second input/output pin 13b. In this embodiment, the data input/output pin 13a adopts a pull high design, while the data input/output pin 13b adopts a pull low design.

The first diode 33 and the second diode 34 serve as protective elements for the RFID tag 10. The resistor 35 and the zener diode 36 in combination serve as a voltage regulation circuit for the RFID tag 10. The first diode 33 has a positive pole connected to the data input/output pin 13a of the RFID tag 10 and a negative pole connected to the second end 152 of the conducting circuit loop 15. The second diode 34 has a positive pole connected to the second end 152 of the conducting circuit loop 15 and a negative pole connected to the data input/output pin 13b of the RFID tag 10 through the voltage regulation circuit formed by the resistor 35 and the zener diode 36.

When the switch 30 is closed, the input/output pins 13a and 13b of the RFID tag 10 are with high potentials (with a conductive code 11) no matter the fracture 154 exists or not, and the input 13b is with low potentials no matter the fracture 154 exists or not when the switch 30 is opened. Therefore, the input 13b may be used to detect whether the switch 30 is closed or opened. Moreover, as the potential of the input 13b of the data input/output port 13 is low, the input 13a may be a high potential (with an open-circuit code 10) or a low potential (with a conductive code 00) depending on whether the fracture 154 exists or not.

Figure 4:
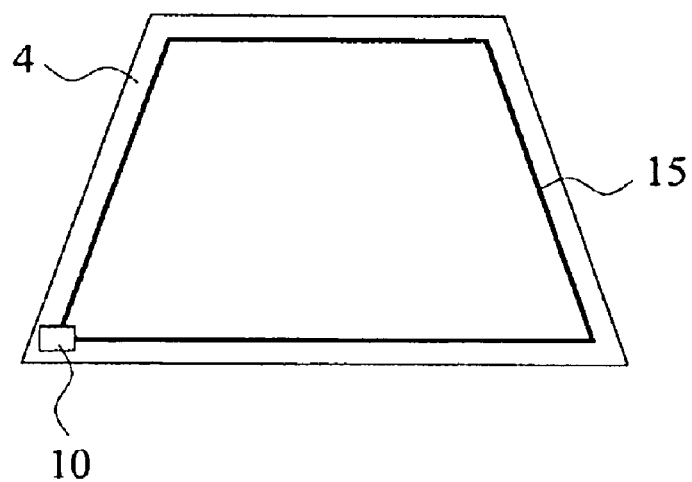
FIG. 4 shows the conducting circuit loop arranged to cover the margin of the substrate in accordance with a third embodiment of the present invention.

Please refer to FIG. 4 that shows the conducting circuit loop arranged to cover the margin of the substrate, a tempered glass, in accordance with a third embodiment of the present invention. As shown in the figure, the substrate is a tempered glass 4 and the conducting circuit loop 15 of the RFID tag 10 is arranged to cover only the margin of the tempered glass 4. Such embodiment has its value because conducting circuit loops 15 may no be able to be arranged to cover the entire surface of the tempered glass 4 due to visibility concerns. Although the strength and the yield stress of a tempered glass is higher than ordinary glass, tempered glass tends to crumble when damaged, and once the tempered glass 4 is crumbled the conducting circuit loop 15 is damaged as well. In this way, the detection of the glass is achieved.

Figure 5:
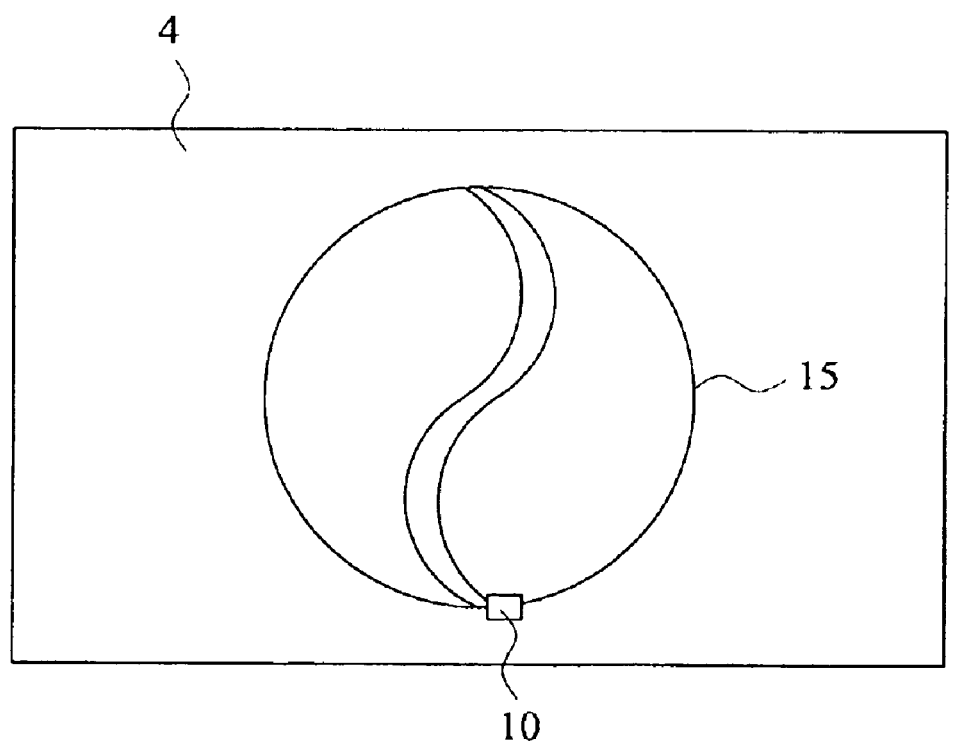
FIG. 5 shows the conducting circuit loop arranged to cover the substrate in accordance with a fourth embodiment of the present invention.

FIG. 5 shows the conducting circuit loop arranged to cover the tempered glass in accordance with a fourth embodiment of the present invention. As shown in the figure, the conducting circuit loop 15 may be arranged in a specific manner to cover a portion of the tempered glass 4.

Figure 6:
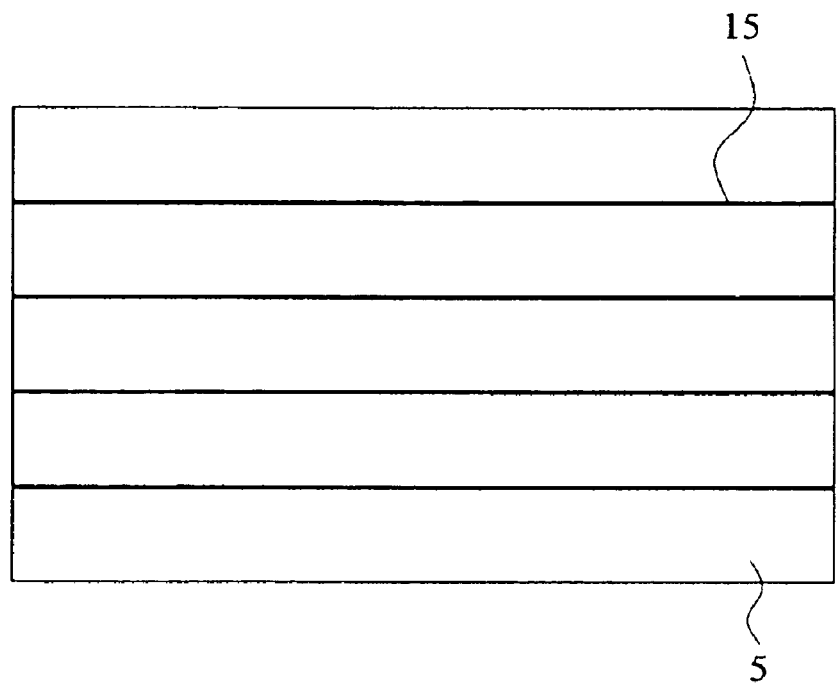
FIG. 6 shows the conducting circuit loop arranged to cover a heat insulating paper in accordance with a fifth embodiment of the present invention.

Please refer to FIG. 6 that shows the conducting circuit loop arranged to cover a heat insulating paper in accordance with a fifth embodiment of the present invention. As shown in the figure, the conducting circuit loop 15 with predetermined intervals is arranged to cover a heat insulating paper 5.

Figure 7:
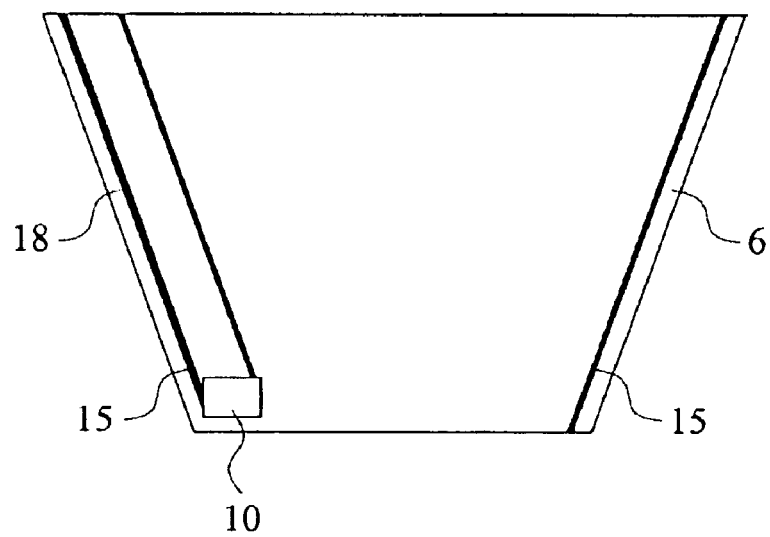
FIG. 7 shows the substrate as a windshield in accordance with the fifth embodiment of the present invention.

Please refer to FIG. 7, which shows the substrate as a windshield in accordance with the fifth embodiment of the present invention, the conducting circuit loop 15 of the RFID tag 10 is arranged to cover the margin of a windshield 6. In practice, a single-sided conducting material 18 (i.e. with an electrical insulating material covering one side) can be arranged at the sides of the windshield 6.

Figure 8:
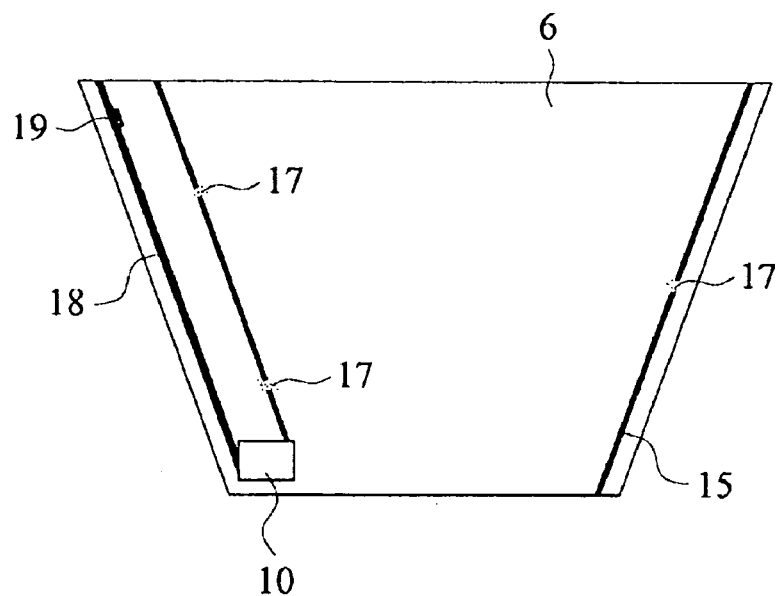
FIG. 8 shows the first step to apply the RFID tag on a windshield in accordance with the fifth embodiment of the present invention.

Please refer to FIG. 8 that shows the first step to apply the RFID tag on a windshield in accordance with the fifth embodiment of the present invention. As shown in the figure, the conducting circuit loop 15 is provided with a plurality of gaps 17, and the single-sided conducting material 18 is provided with an insulator peeled-off area 19, which is later used to electrically connect the conducting circuit loop 15.

Figure 9:
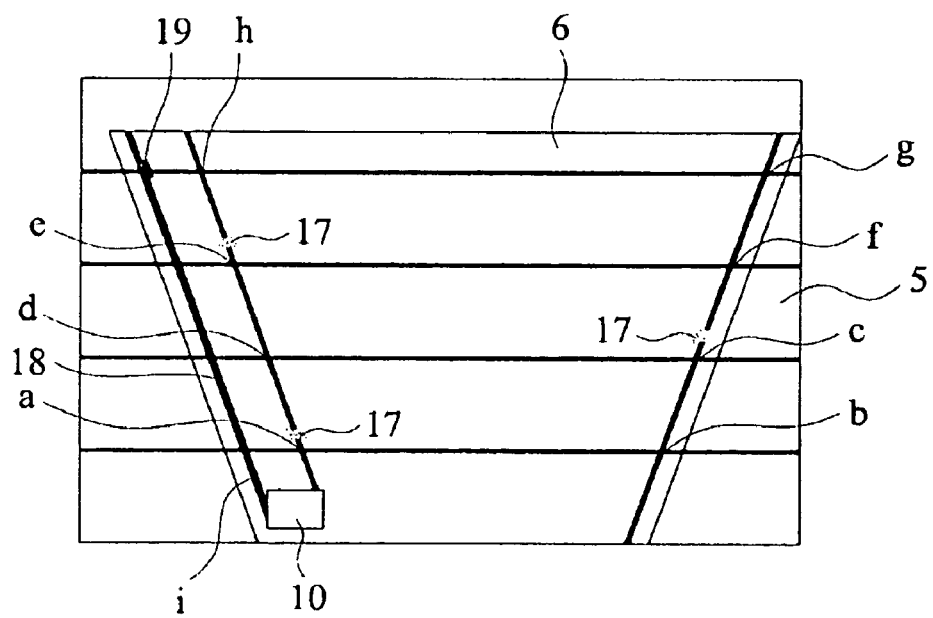
FIG. 9 shows the RFID tag applied on the windshield in accordance with the fifth embodiment of the present invention.

Please refer to FIG. 9, which shows the RFID tag applied on the windshield in accordance with the fifth embodiment of the present invention, the windshield 6 is bond with the heat insulating paper 5 as shown in FIG. 6. Through a plurality of contacts a, b, c, d, e, f, g and h the conducting circuit loops 15 forms an electrically closed loop. Therefore, the detection mechanism of the conducting circuit loop 15 is established. Moreover, although the windshield 6 (tempered glass) tends to crumble when damaged, the heat insulating paper 5 is able to hold the crumbled pieces of the windshield together and prevent it from bursting into pieces.

In practice, multiple ways of encoding the conductive code and the open-circuit code may be adopted. By way of example, the conductive code (generated when the conducting circuit loop 15 is in a closed state) may be a "0" in the binary system, while the open-circuit (generated when the conducting circuit loop 15 is in an opened state) may be a "1". Moreover, to avoid possible encoding errors or faults imported from the manufacturing of the glass, codes with multiple numbers may also be used, that is, a "0000" for a perfectly manufactured glass, a "0010" for a manufactured glass with several faults and a "1111" for a damaged glass.

In addition, the conducting circuit loop 15 may be arranged inside the substrate, and the conducting circuit loop 15 may be made of pliable metal materials such as aluminum, copper or transparent conducting glue.

While the invention has been described in connection with what is presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. A substrate damage detection mechanism using RFID tags, comprising:
   a substrate made of glass material;
   at least one RFID tag with a RFID chip, a RFID transmitter and at least one data input/output port; and
   a defogging circuit arranged to cover the substrate and provided with a first end that is electrically connected to a ground potential and a second end that is electrically connected to the data input/output port of the RFID tag and a potential with a predetermined direct current;
   wherein the RFID chip generates a conductive code when the defogging circuit is originally conducting and generates an open-circuit code when the defogging circuit becomes open circuit resulting from the damage of the substrate in which both the conductive code and the open-circuit code are transmitted by the RFID transmitter and received by a RFID reader to determine the damage of the substrate.

2. The mechanism as claimed in claim 1, wherein the substrate is a windshield of an automobile.

3. The mechanism as claimed in claim 1, wherein the defogging circuit is transparent conducting glue.

4. The mechanism as claimed in claim 1, wherein the defogging circuit is arranged to cover the surface of the substrate.

5. The mechanism as claimed in claim 1, wherein the defogging circuit is arranged to cover the margin of the substrate.

6. The mechanism as claimed in claim 1, further comprises a protecting circuit arranged between the second end of the defogging circuit and the data input/output port of the RFID tag.

7. The mechanism as claimed in claim 6, wherein the protecting circuit comprises at least one diode with a positive pole connected to the data input/output port of the RFID tag and a negative pole connected to the second end of the defogging circuit.

8. The mechanism as claimed in claim 6, wherein the protecting circuit further comprises a voltage regulator.

9. The mechanism as claimed in claim 8, wherein the voltage regulator comprises a zener diode.

* * * * *